C. A. MOTZ.
ELASTIC VEHICLE TIRE.
APPLICATION FILED SEPT. 26, 1906.
926,012.
Patented June 22, 1909.
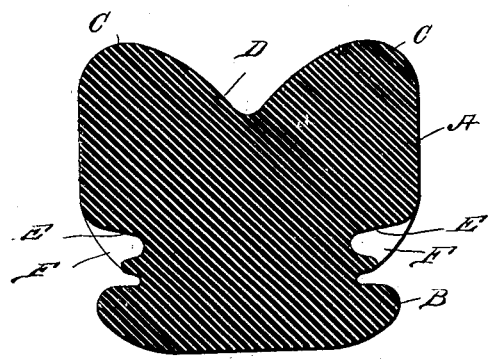
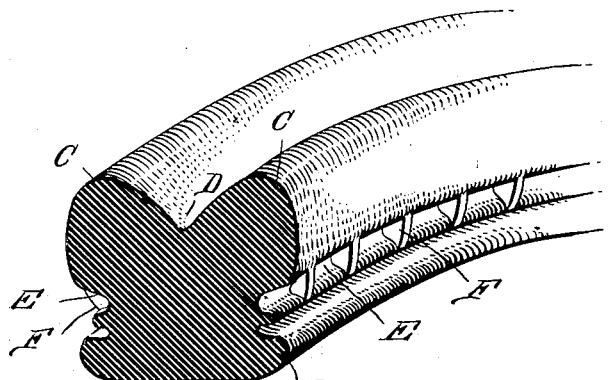

UNITED STATES PATENT OFFICE.

CHARLES A. MOTZ, OF AKRON, OHIO.

ELASTIC VEHICLE-TIRE.

No. 926,012.  Specification of Letters Patent.  Patented June 22, 1909.

Application filed September 26, 1906. Serial No. 336,283.

*To all whom it may concern:*

Be it known that I, CHARLES A. MOTZ, a citizen of the United States, residing at Akron, in the county of Summit and State of Ohio, have invented certain new and useful Improvements in Elastic Vehicle-Tires; and I do hereby declare the following to be a full, clear, and exact description of the same, reference being had to the accompanying drawings, forming a part of this specification, and to the letters of reference marked thereon.

The objects of this invention are to provide an elastic tire which will give an increased road traction, increased resiliency, prevent skidding and aid in forming a solid supporting bed in sandy roads.

The invention consists primarily in a solid rubber or elastic tire having a tread portion with raised side and central depressed portions, such raised side portions preferably taking the form of lateral extensions capable of deflection laterally and toward the rim and producing thereby tension strains in the tread and compression strains in the side portions of the tire.

The invention further consists in certain novel details of construction and combinations and arrangements of parts all as will be hereinafter described and pointed out particularly in the appended claims.

In the accompanying drawings—Figure 1 is a cross section through a tire embodying the present improvements. Fig. 2 is a perspective view of a section of a tire embodying the improvements.

Similar letters of reference indicate like parts in both figures of the drawing.

It is well known that the ordinary round or convex tire does not give sufficient road traction owing to the fact that the major pressure is on a comparatively narrow area at the center of the tire, while the sides of the tire exert only a slight pressure on the road; furthermore in passing over sandy roads such tires force the sand sidewise allowing the tire to sink or bury itself.

In accordance with the present invention, the convex formation of the tread surface is changed to present a central valley or depression while the sides of the tread are extended laterally and bear the major portion of the pressure on hard roads and on sandy roads to confine the sand under the tire thereby forming a solid support which prevents the tire from cutting in or burying itself.

The tire adopted for illustrating the invention is one adapted for use with what is known as a clencher rim but it will be understood that any preferred or usual base formation may be employed. The body of the tire is indicated by the letter A, and the portion to be confined in the rim by the letter B.

The tread of the tire is formed by laterally extending portions C between which and centrally of the tire is a valley or depression D. The laterally extending portions are preferably convex transversely, on the tread, that is to say from the bottom of the depression they arch outwardly. The body of material in the laterally extending portions may be varied within wide limits, but it is preferred that they should be of relatively large cross sectional area.

In each side of the tire and remote from the tread surface and preferably nearer the rim or base of the tire than the bottom of the central valley, are transverse recesses or undercuts as shown at E, said undercut recesses being bridged by elastic webs or bridges F.

By providing undercut recesses in the sides of the tire and supporting the sides of the tread by bridges or webs extending across the recesses, many highly important functional advantages are secured, for instance, the under cutting increases the resiliency of the tire and tends to put the rubber at the center under transverse tension when supporting the weight of the vehicle, thereby insuring a quick recovery when the weight of the load is relieved and at the same time small irregularities, stones and rough places in the road are completely absorbed by displacement of the rubber without imparting vibration or shock to the vehicle. The bridges or webs stay or support the sides of the tire against bodily displacement for any great distance longitudinally of the tire from the point where the load is supported or from the point where the tread is displaced or bent toward the rim by a stone or projection on the road surface. With tires having undercut sides the tendency of the vehicle to rock or roll and skid sidewise has been a serious difficulty, but by the use of the bridges, or webs this defect has been practically eliminated.

While the form and number of the bridges and the form of the walls of the undercuts or recesses in the outer sides of the tire may be varied within wide limits and still secure many of the beneficial advantages of the present invention, it is preferred that the recesses shall be deep toward the center of the tire and narrow from the inner to the outer side, whereby under extreme load conditions, or when passing over a stone or projection in the roadway having a small surface the walls of the recess will be brought close together to increase the elastic resistance in an increasing ratio but without deflecting the tread for any great distance on each side of the obstruction.

Having thus described my invention what I claim as new and desire to secure by Letters Patent is:—

1. As a new article of manufacture, an integral solid elastic rubber tire having two symmetrical tread portions separated by a central circumferential groove and having undercut recesses in the outer sides, each of said tread portions being supported on the outer side by elastic bridges arranged at short intervals between and connecting the opposite walls of the recesses.

2. As a new article of manufacture, an integral solid elastic rubber tire having its tread surface extended on each side of the center, undercut recesses in its sides remote from the tread surfaces, said undercut recesses being relatively deep toward the center of the tire and narrow from the inner toward the outer side of the tire and each of said recesses having elastic bridges arranged at short intervals between and connecting its opposite walls.

3. As a new article of manufacture, a solid rubber tire having free undercut sides stayed at short intervals by webs connecting the walls of the undercut recesses, and two symmetrical convex tread portions separated by a deep circumferential groove, said tread portions normally overlying in part the undercut recesses and adapted to be deflected away from each other to put the rubber between the tread portions under transverse tension.

CHARLES A. MOTZ

Witnesses:
A. W. KLING,
JOHN DETTLING.